United States Patent
Costa et al.

(10) Patent No.: US 7,139,287 B1
(45) Date of Patent: Nov. 21, 2006

(54) TELECOMMUNICATIONS SIGNALLING USING THE INTERNET PROTOCOL

(75) Inventors: Mauro Costa, Pavia (IT); Emiliano Antonio Mastromartino, Milan (IT); Luca Salgarelli, Hoboken, NJ (US); Sutha Sivagnanasundaram, Marlborough (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/936,673

(22) PCT Filed: Mar. 14, 2000

(86) PCT No.: PCT/GB00/00936

§ 371 (c)(1),
(2), (4) Date: Feb. 13, 2002

(87) PCT Pub. No.: WO00/56032

PCT Pub. Date: Sep. 21, 2000

(30) Foreign Application Priority Data

Mar. 15, 1999 (GB) ................................ 9905835.6

(51) Int. Cl.
*H04J 3/16* (2006.01)

(52) U.S. Cl. ...................................... 370/467; 370/522
(58) Field of Classification Search ................ 370/522, 370/395.5, 469, 467
See application file for complete search history.

(56) References Cited

U.S. PATENT DOCUMENTS

| | | | | | |
|---|---|---|---|---|---|
| 5,793,771 | A | * | 8/1998 | Darland et al. | 370/467 |
| 5,842,138 | A | * | 11/1998 | Lu et al. | 455/560 |
| 6,324,183 | B1 | * | 11/2001 | Miller et al. | 370/467 |
| 6,529,524 | B1 | * | 3/2003 | Liao et al. | 370/467 |
| 6,611,533 | B1 | * | 8/2003 | Liao et al. | 370/467 |
| 6,614,784 | B1 | * | 9/2003 | Glitho et al. | 370/352 |
| 6,650,600 | B1 | * | 11/2003 | Machida et al. | 369/24.01 |

* cited by examiner

*Primary Examiner*—Hassan Kizou
*Assistant Examiner*—Jay P. Patel

(57) ABSTRACT

When a telecommunications network involves use of the Internet Protocol, signalling information is passed by providing between a user and the Internet Protocol an interface protocol (56) which interfaces with one or both of the Transport Control Protocol and the User Datagram Protocol. The interface protocol layer provides selected parts of SS7 facilities.

1 Claim, 3 Drawing Sheets

TELECOMMUNICATIONS SIGNALLING USING THE INTERNET PROTOCOL

This invention relates to telecommunications signaling using the Internet protocol, particularly when the telecommunications signaling is Signaling System number 7.

Signaling information needs to be exchanged between network nodes in order to operate the network properly. These requirements make signaling an extremely delicate information, which has to rely on reliable and secure transport mechanisms to ensure that messages are transferred uncorrupted and to guarantee the appropriate level of protection against network failures of any sort.

Traditional telecommunications networks have adopted the Signaling System Number 7 (SS7) as the international standard for common signaling. This is a well-known technology and is used throughout the world both in cellular and fixed networks, and SS7 networks have been proved to be ideal for traditional telephone networks. Internet traffic does not make use of SS7. As a result of the explosion of the Internet, the associated protocols (based on the Internet Protocol (IP)) are becoming ubiquitous and techniques to transfer real-time and mission critical applications using IP are being proposed in the relevant standards organizations. The major drawback typically associated with IP is its unreliability. Traditionally to obtain reliable service in transferring data over an IP network the use of TCP (Transport Control Protocol) was the only choice. But the TCP offers only a best effort type of service to its user. In clear terms this means that the protocols themselves have not been originally designed to satisfy telephone telecom network-like requirements. Background information on signaling protocols and Internet protocols can be obtained from the following documents:

Multi Network Datagram Transmission Protocol (MDTP)—ETF Internet-Draft, Motorola, 15$^{th}$ Feb. 1999;

A Simple SCCP Tunneling Protocol (SSTP). IETF. Internet-Draft, Ericsson, 30$^{th}$ Nov. 1998;

Architectural Framework for Signaling Transport, Ericsson, February 1999.

The problem of transferring real-time critical information. e.g. telecommunications data, over the Internet Protocol has been addressed in different ways. This specification relates to the requirements that SS7 users place on the underlying network General solutions to the problem have been proposed which require the specification of new protocols whose main purpose is to provide fault tolerant reliable/unreliable data transfer between communicating processes over IP networks. These protocols are generic and do not assume specific translation or adaptation functions from/to SS7 protocols.

Another category of solutions includes adaptation layers specifically designed to adapt/shield SS7 users from the underlying IP networks.

The first category of solutions (i.e. generic protocols) are typically rather complex; they are in fact typically conceived for use in the Internet as a distributed geographical network. They have to incorporate reliability and fault management characteristics to compliment the existing Internet Protocols. They have also to include full routing and addressing mechanisms. These solutions are not suited to simple network topology, like point-to-point links arrangements.

The second category of solutions (additional protocols which act as adaptation layers) are located between existing SS7 protocols and existing Internet Protocols, and they have the purpose of shielding the SS7 user from the underlying network. These approaches are powerful but they are mainly conceived as straightforward adaptation protocols to be used in a geographical network, at the boundaries between SS7 domains and IP domains or when inter-working between the two worlds is necessary. Overall, these protocols or adaptation layers have to be inserted between existing protocols like SCCP (Signalling Connection Control Protocol) and TCP. Because of this, they add complexity to the system and are not suited for simple network topology arrangements, for example cellular networks.

In U.S. Pat. No. 5,793,771 MCI Communications Corporation, a system and method for protocol translation are provided, but the disclosure does not relate to systems operating Internet Protocol.

According to the invention method, of providing a user of a telecommunications network with Signalling System Number 7 functionality, the network operating Internet Protocol and at least one of Transport Control Protocol and User Datagram Protocol and having between the user and the Core Network of the telecommunications network at least one interface, characterised by providing between the user and the Internet Protocol an interface protocol layer AP, said interface protocol layer interfacing with at least one of Transport Control Protocol and User Datagram Protocol whereby Signalling System Number 7 information is transmitted across said at least one interface.

Also according to the invention a telecommunications network comprising a Core Network CN and at least one network user and between the user and the Core Network at least one interface, the network operating Internet Protocol and at least one of Transport Control Protocol and User Datagram Protocol, characterised by an interface protocol layer AP between the user and the Core Network, said interface protocol layer being arranged to interface with at least one Transport Control Protocol and User Datagram Protocol whereby Signalling System Number 7 functionality is provided to the user.

Further according to the invention a Base Station Controller for a telecommunications network having a protocol stack comprising a BSS Management Application Part; a Direct Transfer Application Part Distribution Function; at least one of User Datagram Protocol and Transport Control Protocol and Internet Protocol; characterised in that there is an interface protocol layer AP between the Distribution Function Transport Control Protocol/User Datagram Protocol.

Yet further according to the invention a Radio Network Controller for a telecommunications network having a protocol stack comprising Radio Access Network Application Part; at least one of User Datagram Protocol and Transport Control Protocol; and Internet Protocol, characterised in that there is an interface protocol layer AP between the Radio Access Network Application Part and the at least one of User Datagram Protocol for Transport Control Protocol.

In the accompanying drawings, the prior art is illustrated in FIGS. 1 and 2 in which:—

Figure 1:
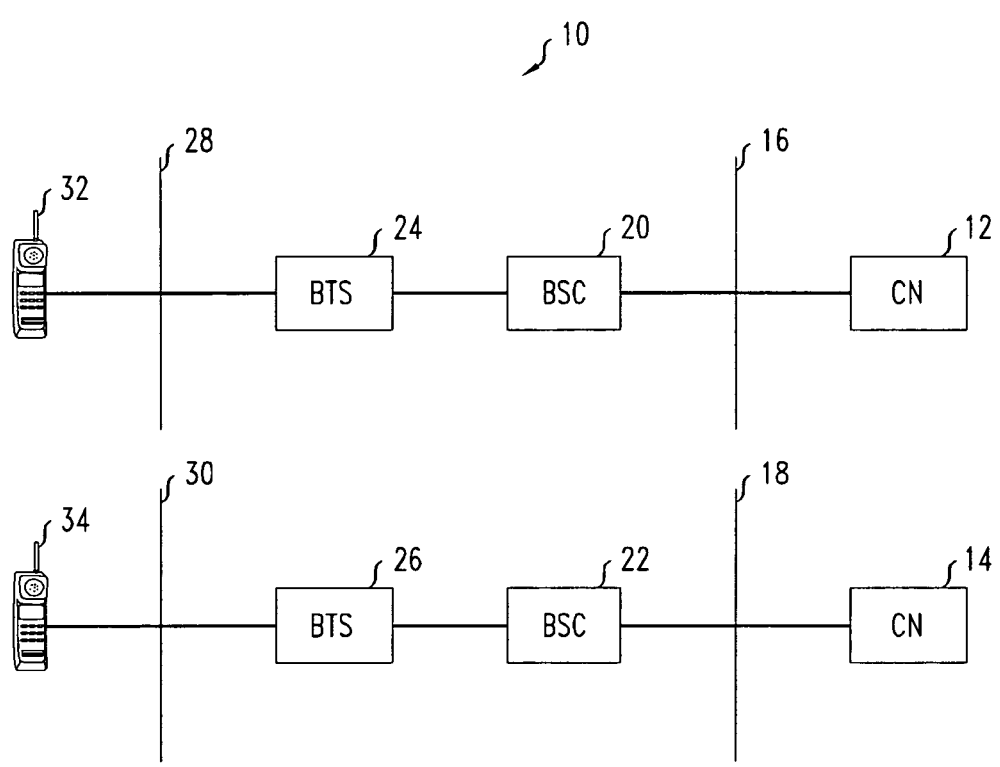
FIG. 1 is a highly schematic diagram of a mobile radio telecommunications system.

In FIG. 1 a GSM and UMTS mobile radio telecommunications system 10 comprises GSM and UMTS Core Networks (CN) 12, 14 which communicate over respective radio access network interfaces 16, 18 with first and second Base Station Controllers (BSC) 20, 22 each controlling a plurality of Base Transceiver Stations (BTS) of which two only 24, 26 are shown. Each BTS controls at least one telecommunications cell over an air interface 28, 30 and each cell may contain one or more mobile users 32, 34.

The SS7 protocol is used to exchange radio access network signalling messages between the CNs 12, 14 and the BSCs 20, 22.

Suppose now that CNs 12, 14 wish to communicate with BSCs 20, 22 through the signalling interfaces 16, 18.

Figure 2:
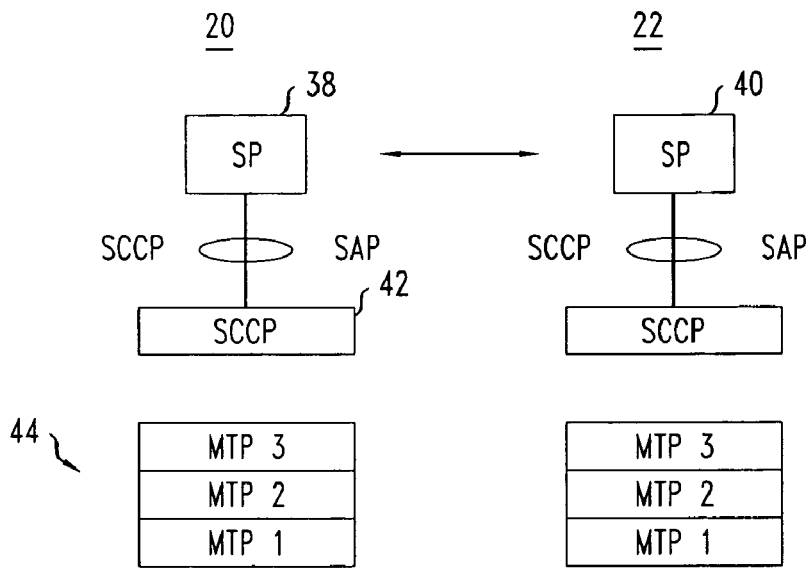
FIG. 2 illustrates a currently-used protocol stack The invention will be described by way of example only with reference to FIGS. 3, 4 and 5 in which:—

The current GSM signalling transport protocol arrangement for the signalling interface 16 is shown in FIG. 2.

The GSM BSC 20 use the signalling interface 16 that operates SCCP 42 which offers to the Signalling Application 38 a number of Service Access Points (SAP) to access its signalling transport services. Below the SCCP protocol layer 42 are three Message Transfer Part (MTP) specialized functional layers 44 that offer network, data link and physical medium access services.

The UMTS BSC 22 to UMTS CN 14 signalling interface has a similar protocol arrangement.

As explained above, this combination of standard SCCP and standard UDP or TCP and IP protocols is not fully satisfactory for passage of signaling information. The invention consists of a protocol which adapts existing SS7 users to the underlying IP network protocol suite. Specifically the invention targets the Transport Control Protocol (TCP) and the User Datagram Protocol (UDP) as underlying protocols.

The proposed adaptation layer provides the user with SCCP SAPs and assumes TCP or UDP as underlying transport protocols. It compliments the functions already provided by the standard transport protocols (i.e. TCP or UDP) with additional functions to provide the user with the same quality of service the user would expect if a full SS7 stack were to be used instead.

Figure 3:
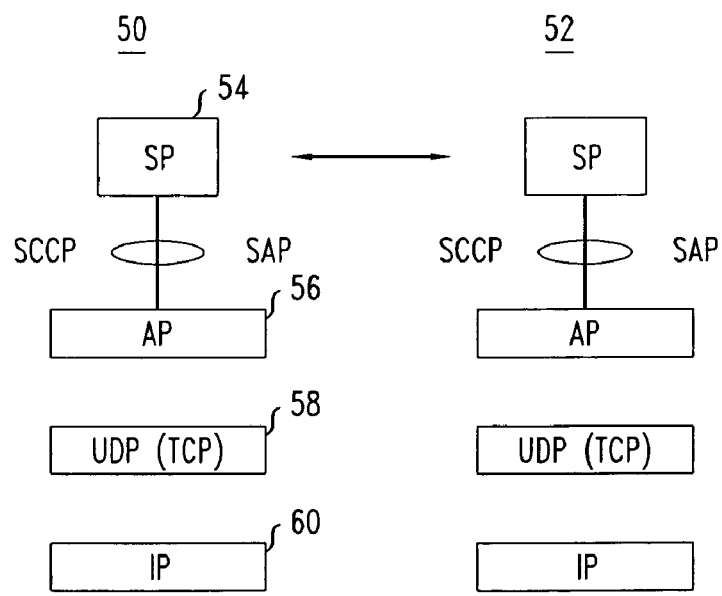
FIG. 3 illustrates the inventive protocol stack.

Referring now to FIG. 3, in a BSC 50 in which the invention is implemented, the signaling application 54 makes use of the SCCP services as in the prior art. The next protocol layer is an Additional Protocol (AP) 56 that provides SCCP services with specific functions. The Additional Protocols, in turn, make use of the transport layer services. As already clarified, the transport layer services can be provided by either TCP or UDP. The UDP layer 58 (layer 4) is used for basic connection less messaging, over the Internet Protocol layer 60 (layer 3) which is used to provide network layer services. The protocol stack in BSC 52 is identical.

As an alternative to, or additional to, the UDP layer, the TCP may be provided.

The AP layer 56 is arranged to provide selected features of SS7 which are interfaced with Internet Protocol, but by addition of a protocol, and not by addition of an application, as in the prior art.

An advantage of such an arrangement is that required features of SS7 can be retained, depending on the circumstances. More detailed implementation in the GSM and the UMTS will now be described.

Figure 4A:
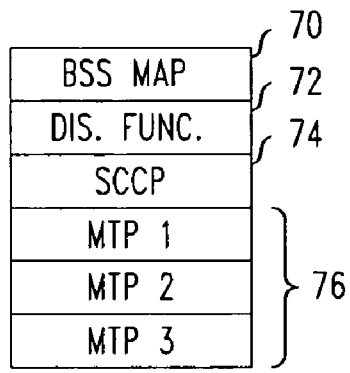
FIGS. 4a and 4b illustrate prior art and inventive protocol stacks implemented in a Base Station Controller in the Global System for Mobile telephones (GSM)

FIG. 4a shows the SS7 signaling protocol stack in a prior art BSC 20 in the GSM system. The protocols are BSSMAP (BSS Management Application Part) 70; DTAP (Direct Transfer Application Part)(Distribution Function) 72; SCCP 74; and three layers of MTP 76.

Figure 4B:
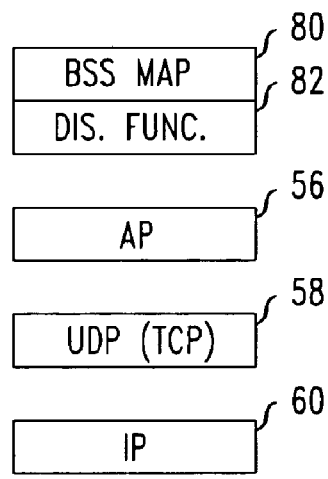

FIG. 4b illustrates the protocol arrangement in a BSC 78 according to the invention. The protocols BSSMAP 80 and DTAP 82 are retained. The next layer is the inventive Additional Protocol layer 56, followed by the UDP or TCP layer 58 and then IP 60.

Figure 5A:
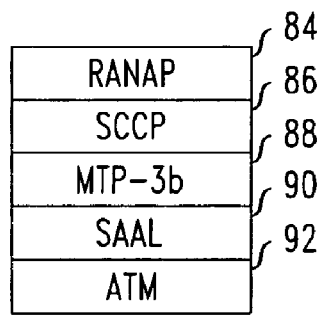
FIGS. 5a and 5b illustrate prior art and inventive protocol stacks implemented in a Radio Network Controller in the Universal Mobile Telephone System (UMTS).

FIG. 5a shows the SS7 signaling protocol stack in the prior art UMTS BSC (equivalent from a gross functional standpoint to the Radio Network Controller in the UMTS access network). The protocol layers are RANAP (Radio Access Network Application Part) 84; SCCP 86; MTP-3b (MTP layer 3 according to Recommendation Q.2210); SAAL (Signalling ATM Adaptation Layer)) 90; and ATM (Asynchronous Transfer Mode) 92.

Figure 5B:
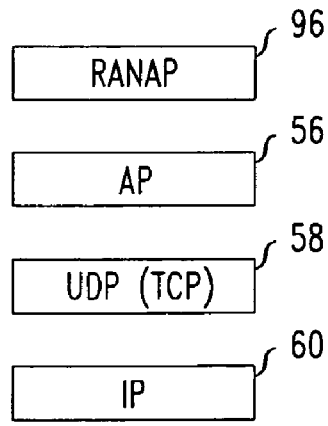

FIG. 5b illustrates the protocol arrangements in an RNC 94 according to the invention. The RANAP layer 96 is retained. The next layer is the inventive additional protocol layer 56 followed by the UDP and/or TCP layer 58, and IP 60.

The major achievement of this invention is the ability to provide SS7-like quality of service over standard TCP or UDP networks. The invention exploits transport and network service characteristics of the underlying transport protocols (UDP or TCP) and network protocol (IP) and reduces the implementation complexity typically required to adapt SS7 to the IP protocol suite. It allows both connection-oriented and connection-less mode of operation as described in ITU-T Recommendation Q.711. It also allows the use of the User Datagram Protocol when the characteristics of the user are compatible with the transfer characteristics provided by UDP. The main improvement on known existing solutions is the simplicity.

The novel Additional Protocol layer AP replaces the standard SS7 stack (or the relevant part of it) and functions with equivalent and more simple functions and provides the user the SCCP services with equivalent quality of service without requiring specific transport protocols or adaptation to existing transport protocol.

The invention claimed is:

1. A method of providing a user of a telecommunications network with Signalling System Number 7 functionality, the network operating Internet Protocol and at least one of Transport Control Protocol and User Datagram Protocol and having between the user and the Core Network of the telecommunications network at least one interface, characterised by providing between the user, and the Internet Protocol an interface protocol layer, said interface protocol layer interfacing with at least one of Transport Control Protocol and User Datagram Protocol whereby Signalling System Number 7 information is transmitted across said at least one interface, wherein the interface protocol layer is provided between the user and a signalling application adopting Signalling Connection Control Protocol Service Access Points (SCCP SAPs) to access the signalling transport service and the Internet Protocol, and wherein, the interface protocol layer providing both connectionless and connection-oriented functions of SCCP SAPs.

* * * * *